(12) United States Patent
Ota et al.

(10) Patent No.: US 9,207,091 B2
(45) Date of Patent: Dec. 8, 2015

(54) DRIVE ASSISTANCE DEVICE

(75) Inventors: Yuko Ota, Tokyo (JP); Masahiko Ikawa, Tokyo (JP); Ryusuke Kinoshita, Tokyo (JP); Shigeki Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/112,476

(22) PCT Filed: Feb. 14, 2012

(86) PCT No.: PCT/JP2012/053358
§ 371 (c)(1),
(2), (4) Date: Oct. 17, 2013

(87) PCT Pub. No.: WO2012/144255
PCT Pub. Date: Oct. 26, 2012

(65) Prior Publication Data
US 2014/0046581 A1 Feb. 13, 2014

(30) Foreign Application Priority Data
Apr. 21, 2011 (JP) ................ 2011-094706

(51) Int. Cl.
*G01C 21/34* (2006.01)
*B60W 30/18* (2012.01)
(Continued)

(52) U.S. Cl.
CPC ......... *G01C 21/3492* (2013.01); *B60W 10/184* (2013.01); *B60W 30/18154* (2013.01); *B60W 40/04* (2013.01); *G08G 1/09623* (2013.01); *G08G 1/09626* (2013.01); *G08G 1/096716* (2013.01); *G08G 1/096758* (2013.01); *G08G 1/096775* (2013.01); *G08G 1/096783* (2013.01);
(Continued)

(58) Field of Classification Search
None
See application file for complete search history.

(56) References Cited

U.S. PATENT DOCUMENTS 6,314,347 B1    11/2001   Kuroda et al.
7,973,674 B2 *  7/2011    Bell et al. .................... 340/901
(Continued)

FOREIGN PATENT DOCUMENTS

JP    2000 333305    11/2000
JP    2001 236600    8/2001
(Continued)

OTHER PUBLICATIONS

International Preliminary Report on Patentability issued Oct. 31, 2013 in PCT/JP2012/053358 filed Feb. 14, 2012.
(Continued)

*Primary Examiner* — Rami Khatib
*Assistant Examiner* — Jeffrey Boomer
(74) *Attorney, Agent, or Firm* — Oblon, McClelland, Maier & Neustadt, L.L.P.

(57) ABSTRACT

A stopping vehicle estimating unit estimates one of a number of stopping vehicles and a length of a stopping vehicle line of different vehicles that are stopping at a traffic light along an estimated driving route ahead of the own vehicle closer to the traffic light than the own vehicle, based on a position information of a site at which a traffic light is provided, an own vehicle position, an own vehicle speed, and traffic information. A passable time zone estimating unit estimates a passable time zone during which the own vehicle is able to pass by the traffic light, based on the one of the number of stopping vehicles and the length of the stopping vehicle line that have been estimated by the stopping vehicle estimating unit, and on schedule information.

14 Claims, 8 Drawing Sheets

(51) Int. Cl.
*B60W 40/04* (2006.01)
*B60W 10/184* (2012.01)
*G08G 1/0967* (2006.01)
*G08G 1/0962* (2006.01)

(52) U.S. Cl.
CPC ...... *G08G 1/096791* (2013.01); *B60W 2550/22* (2013.01)

(56) References Cited

U.S. PATENT DOCUMENTS

| | | | |
|---|---|---|---|
| 2001/0034575 | A1 | 10/2001 | Takenaga et al. |
| 2003/0078718 | A1 | 4/2003 | Takenaga et al. |
| 2010/0004839 | A1* | 1/2010 | Yokoyama et al. ............. 701/70 |
| 2010/0145600 | A1* | 6/2010 | Son et al. ....................... 701/123 |
| 2011/0018701 | A1* | 1/2011 | Mizuno ........................ 340/438 |
| 2011/0205086 | A1* | 8/2011 | Lamprecht et al. ........... 340/928 |
| 2011/0260886 | A1* | 10/2011 | Nagura et al. ................ 340/905 |
| 2011/0320111 | A1* | 12/2011 | Sarma et al. .................. 701/118 |
| 2012/0029730 | A1* | 2/2012 | Nagura et al. ..................... 701/2 |
| 2012/0065871 | A1* | 3/2012 | Deshpande et al. .......... 701/118 |
| 2012/0109510 | A1 | 5/2012 | Ota et al. |
| 2013/0006523 | A1* | 1/2013 | Sato ............................... 701/428 |
| 2013/0013178 | A1* | 1/2013 | Brant et al. .................... 701/117 |
| 2013/0041573 | A1* | 2/2013 | Ochi ............................. 701/117 |
| 2013/0076538 | A1* | 3/2013 | Uno et al. ...................... 340/905 |
| 2013/0110315 | A1* | 5/2013 | Ogawa ................................. 701/1 |
| 2013/0110316 | A1* | 5/2013 | Ogawa ................................. 701/1 |
| 2013/0110371 | A1* | 5/2013 | Ogawa .............................. 701/70 |
| 2013/0245945 | A1* | 9/2013 | Morita et al. ................. 701/533 |
| 2014/0046509 | A1* | 2/2014 | Otake ................................. 701/2 |
| 2014/0210645 | A1* | 7/2014 | Sharma ........................ 340/907 |

FOREIGN PATENT DOCUMENTS

| | | |
|---|---|---|
| JP | 2003 39975 | 2/2003 |
| JP | 2005339286 A * | 12/2005 |
| JP | 2006 31573 | 2/2006 |
| JP | 2008 15670 | 1/2008 |
| JP | 2008 152495 | 7/2008 |
| JP | 2008 242843 | 10/2008 |
| JP | 2009 20661 | 1/2009 |
| JP | 2010 123026 | 6/2010 |
| JP | 2010 146334 | 7/2010 |
| JP | 2010 247703 | 11/2010 |
| JP | 2011 70652 | 4/2011 |
| WO | WO 2010042973 A1 * | 4/2010 |
| WO | 2011 036855 | 3/2011 |

OTHER PUBLICATIONS

Written Opinion issued May 22, 2012 in PCT/JP2012/053358 filed Feb. 14, 2012 (with English translation).
International Search Report Issued May 22, 2012 in PCT/JP12/053358 Filed Feb. 14, 2012.

* cited by examiner

F I G. 1
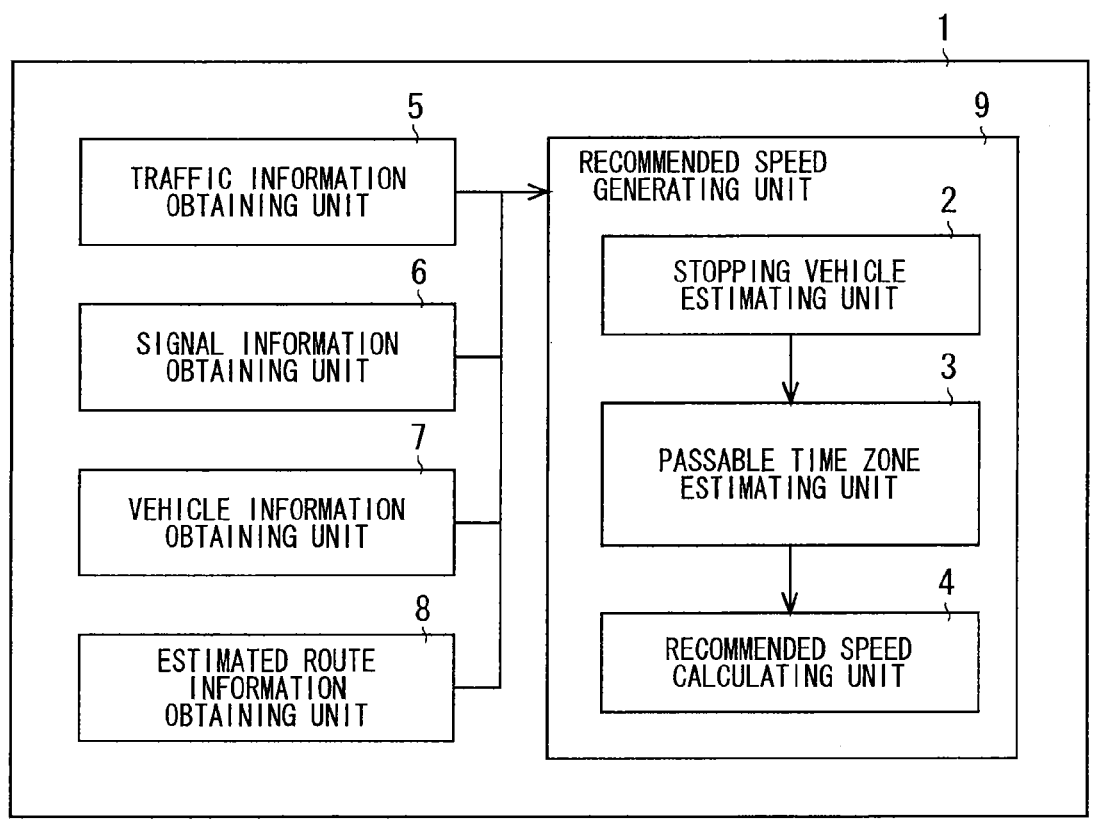

DRIVE ASSISTANCE DEVICE

TECHNICAL FIELD

The present invention relates to a drive assistance device, and in particular to calculation of a time zone during which a traffic light is passable.

BACKGROUND ART

A system capable of presenting a speed with unnecessary acceleration and deceleration being suppressed is named as a system for reducing consumption energy when driving a vehicle. Patent Document 1, as a method of reducing consumption energy, calculates a speed to pass through without stopping at a traffic light utilizing information such as an aspect indication schedule of the traffic light, and presents this to encourage a driver to perform energy-efficient driving.

An object of the above system is to allow passing through a road intersection without stopping: by calculating, at a site P which is a predetermined distance D short of a road intersection provided with the traffic light, and based on signal state information (schedule of green light and red/yellow light) of the road intersection, the distance D, allowable maximum speed information between the site P and the road intersection, and time of arrival at the site P, recommended time required and a recommended driving speed between the site P and the road intersection to pass through the road intersection during the green light; by indicating or transmitting the recommended driving speed to the vehicle; and by having the vehicle drive to the road intersection at the recommended driving speed.

It should be noted that Patent Documents 2 and 3 are disclosed as techniques pertinent to the present invention.

PRIOR ART DOCUMENTS

Patent Documents

Patent Document 1: Japanese Patent Application Laid-Open No. 2006-31573
Patent Document 2: Japanese Patent Application Laid-Open No. 2003-39975
Patent Document 3: Japanese Patent Application Laid-Open No. 2008-242843

SUMMARY OF THE INVENTION

Problems to be Solved by the Invention

However, while a time zone during which a road intersection is passable is taken as a time zone during which the traffic light indicates the green light in the above system, a line of vehicles may often be produced at a road intersection where it is relatively heavily-trafficked such as in an urban area. In such a case, it is not possible to pass through the road intersection while the line of vehicles is not moving even if the traffic light indicates the green light.

Thus, an object of the present invention is to provide a drive assistance device capable of estimating a passable time zone taking different vehicles presenting around the own vehicle into account.

Means for Solving the Problems

A first aspect of a drive assistance device according to the present invention is a drive assistance device mounted on a vehicle, the device including: an estimated route information obtaining unit configured to obtain estimated driving route information including information regarding an estimated driving route along which own vehicle as the vehicle is expected to drive and a position of a site at which a traffic light is provided along the estimated driving route; a vehicle information obtaining unit configured to obtain information regarding an own vehicle position indicating a position of the own vehicle and an own vehicle speed indicating a speed of the own vehicle; a signal information obtaining unit configured to obtain schedule information including information of a traffic light passable time zone during which the traffic light makes an indication that the site is passable; a traffic information obtaining unit configured to obtain traffic information of the estimated driving route; a stopping vehicle estimating unit configured to estimate one of a number of stopping vehicles and a length of a stopping vehicle line of different vehicles that are stopping at the site along the estimated driving route ahead of the own vehicle closer to the site than the own vehicle, based on a position information of the site, the own vehicle position, the own vehicle speed, and the traffic information; and a passable time zone estimating unit configured to estimate a passable time zone during which the own vehicle is passable through the site, based on the one of the number of stopping vehicles and the length of the stopping vehicle line that have been estimated by the stopping vehicle estimating unit, and on the schedule information.

A second aspect of a drive assistance device according to the present invention is a drive assistance device mounted on a vehicle, the device including: an estimated route information obtaining unit configured to obtain estimated driving route information including information regarding an estimated driving route along which own vehicle as the vehicle is expected to drive and a position of a site at which a traffic light is provided along the estimated driving route; a vehicle information obtaining unit configured to obtain information regarding an own vehicle position indicating a position of the own vehicle and an own vehicle speed indicating a speed of the own vehicle; a signal information obtaining unit configured to obtain schedule information including information of a traffic light passable time zone during which the traffic light makes an indication that the site is passable; a traffic information obtaining unit configured to obtain information of a position of an end of a line of different vehicles stopping at the traffic light as traffic information; a stopping vehicle estimating unit configured to estimate one of a number of stopping vehicles and a length of the stopping vehicle line of the different vehicles that are stopping at the site along the estimated driving route ahead of the own vehicle closer to the site than the own vehicle, based on a difference between the traffic information and the position of the site; and a passable time zone estimating unit configured to estimate a passable time zone during which the own vehicle is passable through the site, based on the one of the number of stopping vehicles and the length of the stopping vehicle line that have been estimated by the stopping vehicle estimating unit, and on the schedule information.

Effects of the Invention

According to the first and the second aspects of the drive assistance device of the present invention, it is possible to estimate a passable time zone taking different vehicles presenting around the own vehicle into account.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram illustrating one conceptual example of a configuration of a drive assistance device according to an embodiment of the present invention.

EMBODIMENT FOR CARRYING OUT THE INVENTION

Embodiment

Hereinafter, an embodiment of a drive assistance device according to the present invention will be described. First, a technical focus will be described.

A traffic light as used herein refers to an object notifying a driver whether or not a vehicle is able to pass through a site at which the traffic light is provided. In Japan, for example, the traffic light indicates that a vehicle is passable through this site by making a green light emitter of its own to emit green light (green light indication), and indicates that a vehicle is impassable by making a red light emitter of its own to emit red light (red light indication). Hereinafter, for the sake of convenience, it is discussed assuming that the traffic light is provided at the same position as that of the corresponding road intersection. It should be noted that the traffic light makes a yellow light emitter of its own to emit yellow light (yellow light indication) after the green light and before the red light or in parallel with the red light. Such yellow light indicates that the traffic light is in an essentially impassable state, and passable only when a traffic problem may occur, for example, by a sudden braking. In other words, during a time zone during which the traffic light indicates yellow light or red light, a vehicle is not able to pass by the traffic light in principle. On the other hand, during a time zone during which the traffic light indicates green light, a vehicle is able to pass by the traffic light. It should be noted that, while the following description is given using green light, yellow light, and red light, for example, the technical feature described in this specification may be understood by reading these signal lights appropriately in other countries.

Figure 8:
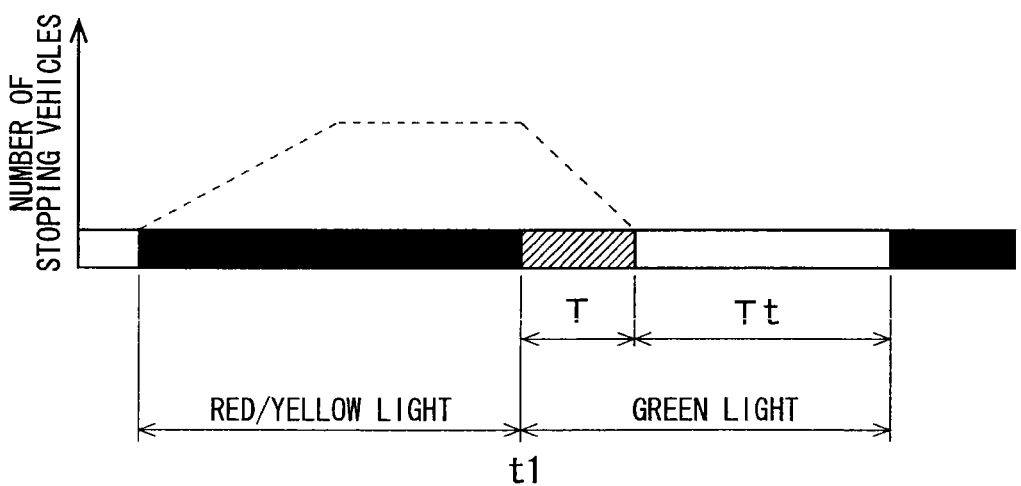
FIG. 8 is a diagram illustrating one example of a relation between passable time calculated by a passable time zone estimating unit of the drive assistance device according to the embodiment of the present invention and an aspect indication schedule of a traffic signal.

Now, the traffic light indicates red light before the green light indication starts. During a period in which the red light is indicated, there is a case in which different vehicles stop at the position closer to this site than the position of own vehicle regarding the site. In this case, the own vehicle may pass by the traffic light after all of these different vehicles pass by the traffic light. Therefore, it is necessary to slow down the driving speed in order to avoid driving into different vehicles after once increasing the driving speed of the own car as the different vehicles are present, even though the own vehicle is able to pass through the road intersection by increasing the driving speed of the own vehicle if there are no different vehicles. This leads to performance of unnecessary acceleration and deceleration. In exemplification of FIG. 8, the schedule of the indication of the traffic light is shown. As illustrated in FIG. 8, a time period T from time t1 at which the traffic light starts the green light indication corresponds to a vehicle line waiting time period T that is required for all of the different vehicles to pass by the traffic light. Thus, the more a number of different vehicles stopping between the own vehicle and the traffic light (hereinafter referred to as a number of stopping vehicles) is, the longer such a vehicle line waiting time period T becomes. The exemplification of FIG. 8 also shows one schematic example of the number of stopping vehicles. It should be noted that as a concept similar to the number of vehicles, a distance between an end of a line of vehicles stopping at the traffic light and the traffic light (hereinafter referred to as a length of a stopping vehicle line) are named. Therefore, it is also understood that the longer the length of the stopping vehicle line is, the longer the vehicle line waiting time period T becomes.

Thus, according to this embodiment, the vehicle number of the different vehicles stopping between the own vehicle and the traffic light or the length of the stopping vehicle line is estimated. Then, considering the estimated number of stopping vehicles or the length of the stopping vehicle line, a passable time zone during which the traffic light is passable is estimated. With this, it is possible to estimate the passable time zone taking the presence of different vehicles around the own vehicle into account.

Hereinafter, one example of a specific configuration of this drive assistance device will be described. This drive assistance device is mounted on a vehicle (an engine-driven car, a hybrid car, or an electric car) driving a road. In the following, a vehicle on which this drive assistance device is mounted is referred to as the own vehicle. As exemplarily shown in FIG. 1, a drive assistance device 1 is provided with a traffic information obtaining unit 5, a signal information obtaining unit 6, a vehicle information obtaining unit 7, an estimated route information obtaining unit 8, and a recommended speed generating unit 9.

The drive assistance device 1 is further provided with a recording medium (not depicted) in which map information is recorded. The map information may be previously stored in the recording medium, or if the drive assistance device 1 is able to communicate with a base station storing the map information, the map information may be obtained from the base station and stored in the recording medium.

The map information includes road data configured by link data representing roads and node data representing road intersections. The link data indicates each section connecting nodes when each road is divided at a plurality of nodes (node data) which are points at which the roads intersect, branch, or merge. The link data has, for each section, data such as a unique number identifying the section, a section length indicating the length of the section, coordinates (latitude/longitude) of a starting point and an ending point of the section, a class of the road of the section (such as a national road), a number of traffic lanes of the section, presence or not of a right-turn/left-turn lane, a number of the exclusive lanes, and a speed limit. The node data has, for each road intersection (node) at which the roads intersect, branch, or merge, a unique number identifying the node, coordinates of the node, a unique number of a link connected to the node, presence or not of a traffic light, a type of the traffic light (such as, whether it is possible to output a right-turn signal or not), a position of a stop line in front of the traffic light, and such.

The estimated route information obtaining unit 8 specifies an estimated driving route along which the own vehicle is estimated to drive using the map information, and outputs the specified estimated driving route to the recommended speed generating unit 9 as estimated driving route information. Specification of such an estimated driving route is performed in the following manner, for example.

There is a case in which a car navigation system is mounted on the own vehicle, for example. On the car navigation system, typically, a GPS (Global Positioning System; global positioning system) receiver is mounted. The car navigation system receives information from a satellite using the GPS receiver, and obtains a current position of the own vehicle by mapping the information on the map information. The car navigation system further includes a function of obtaining recommended routes to a destination designated by a user using the current position and the map information, and a guide function of setting a route selected by the user from the recommended routes as a navigation route and guiding the user to drive along the navigation route.

The estimated route information obtaining unit 8 may specify the navigation route as the estimated driving route. The estimated driving route information includes road intersection (node) information (such as a position of a road intersection, directions allowed to move ahead at the road intersection (such as straight, right turn, and left turn)), a speed limit, a number of traffic lanes, a position of a traffic light, a type of the traffic light (right-turn signal, left-turn signal), a position of a stop line near the traffic light, slope information, curve information, and such. It should be noted that the estimated driving route information is not necessarily required to include all of the above, and may include the information used in a procedure that will be later described.

Further, if the drive assistance device 1 (or the car navigation system) includes a function of recording drive history by repeating obtaining of a current position and recording of the current position while the own vehicle drives, the estimated driving route may be specified in the following manner. Specifically, the estimated route information obtaining unit 8 may specify a route including the current position and have most frequently been driven as the estimated driving route.

Further, the estimated route information obtaining unit 8 may determine the type of the road along which the own vehicle is currently driving using the current position and the map information, for example, and when the road is determined to be a main road, specify a route along the main road as the estimated driving route.

The specification of the estimated driving route is repeatedly executed when starting the drive, when the navigation route is set or altered, when the own vehicle deviates from the specified estimated driving route, or at predetermined intervals.

The recommended speed generating unit 9 receiving the estimated driving route information may specify a location and such of a traffic light estimated to be passed by the own vehicle.

The vehicle information obtaining unit 7 obtains a current position of the own vehicle (own vehicle current position), and outputs this to the recommended speed generating unit 9. The current position of the own vehicle may be obtained by, for example, mapping the information obtained by the GPS receiver on the map information. The obtaining and the outputting of the own vehicle current position are executed at predetermined intervals, for example.

Further, the vehicle information obtaining unit 7 further obtains a speed of the own vehicle (own vehicle speed), and outputs this to the recommended speed generating unit 9. For example, the own vehicle may be provided with a known speed detection sensor (a sensor of various types such as a gyroscope, for example), and the own vehicle speed may be detected by this speed detection sensor. Alternatively, the own vehicle speed may be calculated based on the change of the current position over time. The obtaining and the outputting of the own vehicle speed are executed at the same timing as the obtaining and the outputting of the own vehicle current position, for example.

The recommended speed generating unit 9 may calculate a distance to the next traffic light and such, for example, based on the own vehicle current position and the estimated driving route information that have been inputted. The recommended speed generating unit 9 may calculate time until the own vehicle arrives at the traffic light further using the own vehicle speed. It should be noted that in order to improve accuracy in calculation, a rate of acceleration of the own vehicle may be inputted to the recommended speed generating unit 9. For example, a known acceleration sensor is provided for the own vehicle, and the rate of acceleration is detected by the vehicle information obtaining unit 7 using the acceleration sensor.

The signal information obtaining unit 6 obtains aspect indication schedule information of a traffic light, and outputs this to the recommended speed generating unit 9. The aspect indication schedule information includes information at least of a time zone during which the indication that the traffic light is passable is made (that is, the green light is indicated). It should be noted that, generally speaking, the aspect indication schedule information includes a time zone during which the green light is indicated, a time zone during which the yellow light is indicated, and a time zone during which the red light is indicated. The obtaining of the aspect indication schedule information is performed in the following manner, for example.

The signal information obtaining unit 6 is configured to be able to communicate with an external device (for example, a center controlling a traffic light) having the aspect indication schedule information, and obtains the aspect indication schedule information from the center. Alternatively, the signal information obtaining unit 6 may be, for example, configured to be able to communicate with roadside wireless equipment provided near a bywalk or a center median along the road, and if the roadside wireless equipment has the aspect indication schedule information, may obtain the aspect indication schedule information from the roadside wireless equipment. Alternatively, if the drive assistance device 1 is configured to be able to communicate with the different vehicle (so-called vehicle-to-vehicle communication), and if the different vehicle has the aspect indication schedule information, it is possible to obtain the aspect indication schedule information from the different vehicles. Alternatively, the aspect indication schedule information may be obtained from the center via the roadside wireless equipment or the different vehicles.

Further, the signal information obtaining unit 6 may obtain the current aspect indication schedule information learning from the drive history in the past. As used herein, the drive history in the past is the aspect indication schedule information of the traffic light by which the own vehicle has passed before. In other words, the signal information obtaining unit 6 may estimate the current aspect indication schedule based on the past aspect indication schedule information. Such a case will be described. First, the signal information obtaining unit 6 obtains, on the driving route along which the own vehicle drives, for example, the aspect indication schedule information from the center, and records this in a predetermined recording medium (not depicted) of the drive assistance device 1. Then, the signal information obtaining unit 6 uses the aspect indication schedule information for the same traffic light and the same time zone as the current aspect indication schedule information out of the past aspect indication schedule information recorded in the recording medium. Such a method of obtaining is particularly effective when it is not possible to obtain the current aspect indication schedule information from the external device due to some kind of trouble, for example. On the other hand, when the aspect indication schedule information is obtained from the external device (the center, for example), a degree of certainty of the aspect indication schedule information is higher.

Further, when the own vehicle drives along the frequently driving route, it is also possible to estimate the current aspect indication schedule information based on the past aspect indication schedule information. The past aspect indication schedule information for the traffic light on the route along which the own vehicle drives frequently may be obtained in the above manner, or may be obtained in the following manner. Specifically, the signal information obtaining unit 6 determines whether or not the own vehicle has passed by the traffic light, and accumulates this information. If it is the frequently driving route, such information is accumulated, and the aspect indication schedule for the traffic light along the route may be obtained. It should be noted that the determination on whether or not the traffic light has been passed by is executed, for example, based on the own vehicle current position. Alternatively, the aspect indication schedule information may be obtained by providing an image sensor for the own vehicle, identifying the type of the traffic light indication by image processing, and accumulating the time during which the red/yellow light is indicated and the time during which the green light is indicated.

Further, it is possible to use aspect indication schedule information that has been predicted using relative time of the current aspect indication schedule information for a nearby traffic light and the aspect indication schedule information for each traffic light along the estimated driving route obtained from the past drive history.

The output of the aspect indication schedule information is performed when the aspect indication schedule information is obtained, when the obtained aspect indication schedule information changes, or when a request from the recommended speed generating unit 9 is made. For example, when it is possible to predict, from the past drive history, a relative signal schedule along one route (such as "a second traffic light indicates green x seconds after a first traffic light indicates green" or simply "the first traffic light indicates green y seconds after indicating red"), a future signal schedule is predicted from an aspect of the current traffic light along the route (including information as to how many seconds have passed since it has turned red) utilizing the information.

The traffic information obtaining unit 5 obtains traffic information for estimating the number of stopping vehicles between the own vehicle and the traffic light or the length of the stopping vehicle line, and outputs this to the recommended speed generating unit 9. While specific examples of the traffic information will be described later, these include, for example, a current position of the different vehicle around the own vehicle (different vehicle current position) and a speed of the different vehicle (different vehicle speed). Such a different vehicle current position and such a different vehicle speed may be obtained when the own vehicle and the different vehicle have a configuration, for example, that enables vehicle-to-vehicle communication to each other and the different vehicle holds information of its own current position and speed, through this communication. Alternatively, for example, a sensor of various types such as a millimeter-wave radar or a sensor using ultrasonic wave may be provided for the own vehicle, and the different vehicle current position and the different vehicle speed may be obtained by this sensor. Alternatively, an image pickup device taking an image around the own vehicle may be provided for the own vehicle, and the different vehicle current position and the different vehicle speed may be obtained by analyzing the image obtained by this.

The obtaining of the traffic information may be executed periodically without any other conditions, or may be executed periodically within a period that the distance between the own vehicle and the traffic light (or the stop line in front of the traffic light) is equal to or smaller than a predetermined distance. The outputting of the traffic information is executed when the traffic information is detected, when the obtained traffic information changes, or when a request from the recommended speed generating unit 9 is made.

While specific examples of the function of the recommended speed generating unit 9 will be described later, its outline will be described. The recommended speed generating unit 9 is provided with a stopping vehicle estimating unit 2, a passable time zone estimating unit 3, and a recommended speed calculating unit 4.

To the stopping vehicle estimating unit 2, the traffic information, the aspect indication schedule information of the traffic light, the own vehicle current position, the own vehicle speed, and the estimated driving route are inputted. The stopping vehicle estimating unit 2 uses these to estimate the number of stopping vehicles or the length of a stopping vehicle line that stop before the own vehicle at a signal immediately ahead of the own vehicle or thereafter.

The estimation of the number of stopping vehicles or the length of the stopping vehicle line is executed when the traffic information is obtained, or when the distance between the traffic light (or the stop line in front of the traffic light, hereinafter the same applies) and the own vehicle becomes equal to or smaller than the predetermined distance. Alternatively, it may be executed periodically without any other conditions, or may be executed periodically within a period that the distance between the traffic light and the own vehicle is equal to or smaller than a predetermined distance. The number of stopping vehicles or the length of the stopping vehicle line that have been estimated is outputted to the passable time zone estimating unit 3.

To the passable time zone estimating unit 3, the aspect indication schedule information of the traffic light, and the number of stopping vehicles or the length of the stopping vehicle line are inputted. The passable time zone estimating unit 3 uses these to estimate the passable time zone during which the own vehicle is able to pass by the traffic light. The estimated passable time zone is outputted to the recommended speed calculating unit 4. Further, estimated vehicle line end information at a time when the own vehicle arrives at the traffic light may also be outputted.

The estimation of the passable time zone is executed when the information is obtained from the stopping vehicle estimating unit 2, or periodically executed.

As described above, according to the passable time zone estimating unit 3, the passable time zone during which the traffic light is passable is calculated using the number of stopping vehicles or the length of the stopping vehicle line of the different vehicles stopping between the own vehicle and the traffic light. Thus, it is possible to calculate the passable time zone taking the presence of the different vehicles into account.

To the recommended speed calculating unit 4, the own vehicle current position, the own vehicle speed, the estimated driving route information, and the passable time zone are inputted. The recommended speed calculating unit 4 generates a recommended speed at which consumption energy while driving may be reduced (a recommended speed pattern from the own vehicle current position on the estimated driving route). In the calculation of the recommended speed pattern, a pattern that enables the own vehicle to drive with minimum acceleration and deceleration under a restraint condition such as traffic regulation such as the passable time zone and the speed limit is calculated, for example.

Figure 2:
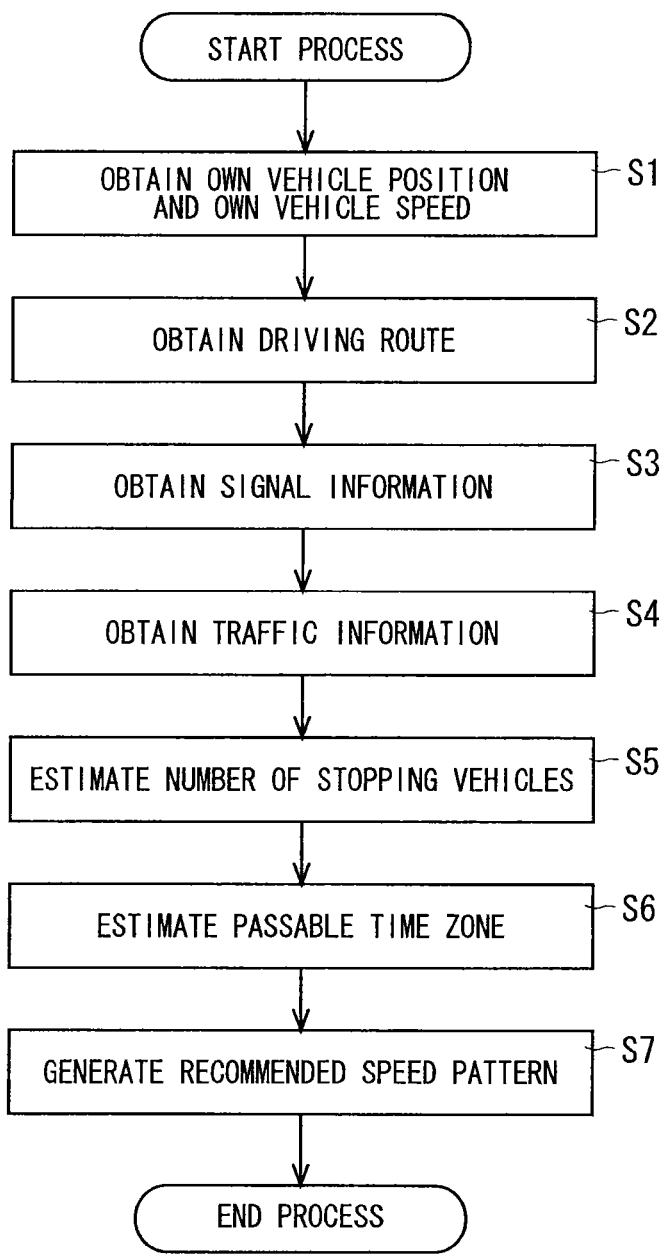
FIG. 2 is a flowchart showing one example of an operation of the drive assistance device according to the embodiment of the present invention.

Next, one example of an operation of the drive assistance device 1 according to this embodiment 1 will be described in detail. FIG. 2 is a flowchart showing one example of the operation of the drive assistance device 1 according to this embodiment 1.

A recommended speed pattern generating process shown in FIG. 2 is executed at predetermined timing after the drive has started. For example, the execution is repeated at timing at which the distance between the own vehicle and the traffic light becomes equal to or smaller than the predetermined distance, every predetermined distance or predetermined time, timing at which the aspect indication schedule information is received, or timing at which the traffic information is received.

First, in Step S1, the stopping vehicle estimating unit 2 obtains the own vehicle current position and the own vehicle speed from the vehicle information obtaining unit 7.

Next, in Step S2, the stopping vehicle estimating unit 2 obtains the estimated driving route from the own vehicle current position obtained in Step S1 from the estimated route information obtaining unit 8. When such an estimated driving route is the navigation route, the estimated driving route may be a driving route to the destination of the own vehicle, may be a driving route for a predetermined distance, or may be a driving route by a predetermined number of traffic lights.

Next, in Step S3, the stopping vehicle estimating unit 2 obtains the aspect indication schedule information for traffic lights along the estimated driving route obtained in Step S2 from the signal information obtaining unit 6.

Next, in Step S4, the stopping vehicle estimating unit 2 obtains the traffic information from the traffic information obtaining unit 5. The traffic information is current positions and speeds of the different vehicles around the own vehicle, for example.

Next, in Step S5, the stopping vehicle estimating unit 2 estimates the number of stopping vehicles or the length of the stopping vehicle line at each traffic light using the own vehicle current position and the own vehicle speed that have been obtained in Step S1, the estimated driving route obtained in Step S2, the aspect indication schedule information of the traffic lights along the estimated driving route that has been obtained in Step S3, and the traffic information that has been obtained in Step S4.

Now, referring to FIG. 8, in terms of the estimation accuracy of the vehicle line waiting time period T, it is desirable that the number of stopping vehicles estimated here is a number of vehicles that stop closer to the traffic light than the own vehicle at time t1 at which the traffic light starts outputting green light (see also FIG. 8). It should be noted that when the own vehicle arrives near the traffic light during a red/yellow light time zone, the number of stopping vehicles at a time point at which the own vehicle arrives at the traffic light may be assumed to be the number of stopping vehicles at time t1. This is because the number of the vehicles ahead of the own vehicle rarely increases or decreases after the own vehicle stops at the traffic light.

Hereinafter, one example of a method of estimating the number of stopping vehicles will be described. The estimation of the number of stopping vehicles is performed in the following manner, for example. Specifically, first, a distance D_i from the different vehicle current position to the traffic light (or stop line) is divided by a different vehicle speed V_i to calculate expected signal arrival time D_i/V_i. Next, it is determined, based on the expected signal arrival time and the aspect indication schedule information for the traffic light, whether each of the different vehicles is able to pass by the traffic light. Then, for example, out of the vehicles that have been determined to be unable to pass through, the number of the vehicles that are determined to be present ahead of the own vehicle at a time point at which the own vehicle arrives in a range of a predetermined distance from the traffic light is estimated as the number of the stopping vehicles. According to such estimation, the estimation accuracy of the number of stopping vehicles is high, as the number of the stopping vehicles is estimated from the current positions and the speeds of the different vehicles. Further, as the number of the stopping vehicles may vary depending on the arriving time point at which the own vehicle arrives in the range or a predetermined distance from the traffic light, it is possible to calculate a correspondence table of a function between the arriving time point and the number of stopping vehicles. Specifically, instead of simply outputting the number of stopping vehicles at one time point, it is possible to output information on a change over time of the number of the stopping vehicles indicating how many numbers of stopping vehicles is expected to be present at any time point. For example, for the change of the number of stopping vehicles represented by a dashed line in FIG. 8, a function (the number of stopping vehicles to time) or a table (pairs of the time and the vehicle number) are outputted.

Here, a case in which the road from the own vehicle current position to the traffic light is single lane on each side is described taken as an example. It should be noted that whether or not the road is single lane on each side is determined based on the information for the number of traffic lanes included in the estimated driving route information, and the following method of estimation is executed when the determination is positive.

Figure 3:
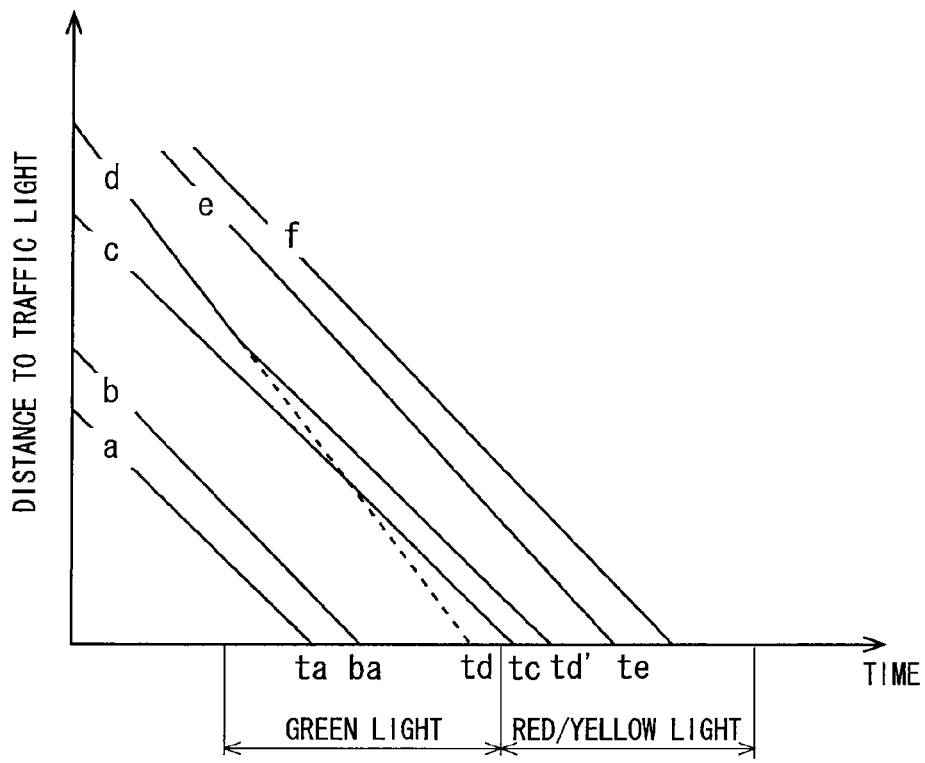
FIG. 3 is a diagram illustrating an example of estimation of a number of stopping vehicles by a stopping vehicle estimating unit of the drive assistance device according to the embodiment of the present invention using information of driving positions and driving speeds of different vehicles as traffic information.

FIG. 3 shows the estimation of the number of stopping vehicles when the current position and the speed of each of the different vehicles a to e are obtained by the vehicle-to-vehicle communication in a single lane road on each side. In FIG. 3, the horizontal axis indicates time, and the vertical axis indicates a distance between each vehicle and the traffic light. Further, an original point of the horizontal axis represents the current time. At the current time, a distance between the traffic light and an own vehicle f is the largest, and a distance from the traffic light increases in an order of the vehicles a to f. Further, in FIG. 3, along the horizontal axis, a green light time zone (corresponding to the traffic light passable time zone) and a red/yellow light time zone (corresponding to a traffic light impassable time zone) are shown as the aspect indication schedule information for the traffic light.

First, the stopping vehicle estimating unit 2 obtains, from the traffic information obtaining unit 5, the different vehicle current positions and the different vehicle speeds of the different vehicles a to e located ahead of the own vehicle f at the current time. It should be noted that it is not necessary to obtain information of vehicles behind the own vehicle. This is because, as overtaking is prohibited if the road is single lane on each side, the different vehicles behind the own vehicle at the current time will not stop at the traffic light ahead of the own vehicle.

Next, the stopping vehicle estimating unit 2 calculates time at which each of the different vehicles a to e arrives at the traffic light (in this case, at the road intersection) (hereinafter referred to as "signal arrival time") when the different vehicles a to e drive at a speed of the current time, from the different vehicle current position and the different vehicle speed that have been obtained. The signal arrival time is obtained by adding the current time to the expected signal arrival time D_i/V_i. Next, the stopping vehicle estimating unit 2 determines whether or not the time zone during which the traffic light outputs green light (hereinafter referred to as a green light time zone) includes the signal arrival time for each of the different vehicles.

It should be noted that it is desirable that such calculation of the signal arrival time and determination on whether the signal arrival time is included in the green light time zone be executed, for example, sequentially vehicle by vehicle from a vehicle located closer to the traffic light at the current time. In the following, the description is given according to this procedure.

In exemplification of FIG. 3, signal arrival time to of the different vehicle a that is closest to the traffic light at the current time is included in the green light time zone, and signal arrival time tb of the different vehicle b calculated thereafter is also included in the green light time zone. Therefore, the different vehicles a and b are estimated to pass by the traffic light. Signal arrival time tc of the different vehicle c calculated thereafter is not included in the green light time zone. Therefore, the different vehicle c is estimated to stop at the traffic light. Then, the stopping vehicle estimating unit 2 determines that the different vehicles d and e that are behind the different vehicle c at the current time shall also stop, and estimates the number of stopping vehicles to be three. Specifically, as the road is single lane on each side here, as illustrated in FIG. 3, for example, even if the different vehicle d behind the different vehicle c catches up the different vehicle c, the different vehicle d also stops at the traffic light failing to overtake the different vehicle c. Therefore, at a time point at which it is determined that the different vehicle c stops, it is also determined that the different vehicles d and e stop. With this, the number of stopping vehicles may be estimated to be three without executing the calculation of signal arrival times td and te of the different vehicles d and e and the determination whether the signal arrival times td and te is included in the green light time zone, and it is possible to shorten time to estimate the number of stopping vehicles. It should be noted that, in FIG. 3, a chart where the different vehicle c is overtaken based on the different vehicle speed of the vehicle d at the current time is represented in a broken line. This also applies to other charts that will be later described.

Figure 4:
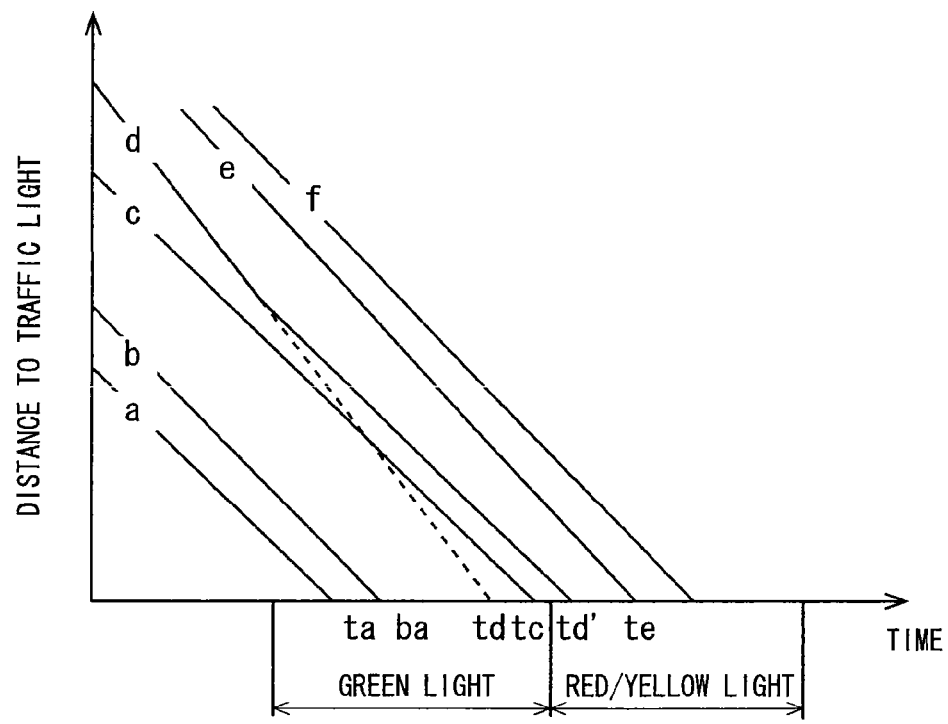
FIG. 4 is a diagram illustrating an example of the estimation of the number of stopping vehicles by the stopping vehicle estimating unit of the drive assistance device according to the embodiment of the present invention using the information of driving positions and driving speeds of different vehicles as the traffic information.

FIG. 4 shows a case in which the signal arrival time tc of the different vehicle c is included in the green light time zone in FIG. 3. In this case, the stopping vehicle estimating unit 2 calculates the signal arrival time td of the different vehicle d after determining that the signal arrival time tc is included in the green light time zone, for example. In exemplification of FIG. 4, the signal arrival time td is time earlier than the signal arrival time tc. However, as each of the vehicles a to f drives the road with a single lane on each side, the different vehicle d is not able to overtake the different vehicle c, and reliability of the signal arrival time td of the different vehicle d that has been calculated is low. Specifically, it is estimated that when the distance to the different vehicle c becomes short, the different vehicle d actually slows down its speed and switches to following drive to follow the different vehicle c.

In order to determine this, for example, the stopping vehicle estimating unit 2 determines whether or not the calculated signal arrival time of each of the different vehicles is earlier than the signal arrival time of a different vehicle immediately ahead of this different vehicle at the current time. Then, if the positive determination is made, the stopping vehicle estimating unit 2 corrects the calculated signal arrival time of the different vehicle to be time later than the signal arrival time of the different vehicle immediately ahead by predetermined time. In the exemplification of FIG. 4, the signal arrival time td of the different vehicle d is corrected to be time td' after the signal arrival time tc of the different vehicle c by the predetermined time. Such predetermined time may be a predetermined value, or may be a value that becomes longer as the different vehicle speed of the different vehicle c is lower. This is because as the different vehicle speed of the different vehicle c is low, the signal arrival time of the different vehicle d delays. For example, in the exemplification of FIG. 4, the time td' is not included in the green light time zone. Therefore, the stopping vehicle estimating unit 2 estimates the number of stopping vehicles to be two including the different vehicle d and the different vehicle e behind this.

As described above, when the road between the traffic light and the own vehicle is single lane on each side, it is determined whether or not the arrival signal arrival time of each of the different vehicles is earlier than the signal arrival time of the different vehicle immediately ahead of this different vehicle at the current time. Then, if the positive determination is made, the calculated signal arrival time of the different vehicle is corrected to be time later than the signal arrival time of the different vehicle immediately ahead by predetermined time, and therefore it is possible to calculate the signal arrival time accommodating an actual traffic situation. Thus, it is possible to improve estimation accuracy of the number of stopping vehicles.

Further, in a case in which the traffic information obtaining unit 5 is able to obtain the estimated driving route of the different vehicle by the vehicle-to-vehicle communication, it is possible to consider a traveling direction of the different vehicle considering the estimated driving route of the different vehicles. For example, the stopping vehicle estimating unit 2 may determine whether or not to pass by the traffic light based on the drive estimated route of each of the different vehicles, and a signal arrival time may be calculated only for the different vehicle that is determined to pass by the traffic light. In exemplification of FIG. 5, it is assumed that as a result of the obtaining of the estimated driving route of each of the different vehicles a to e, the estimated driving routes of the different vehicles a, b, d, and e go through by the traffic light, and the estimated driving route of the different vehicle c does not go through by the traffic light. It should be noted that in FIG. 5, a chart after a time point at which the different vehicle c deviates the estimated driving route of the own vehicle f is shown by alternate long and short dash line. This also applies to FIG. 6 that will be later described.

Figure 5:
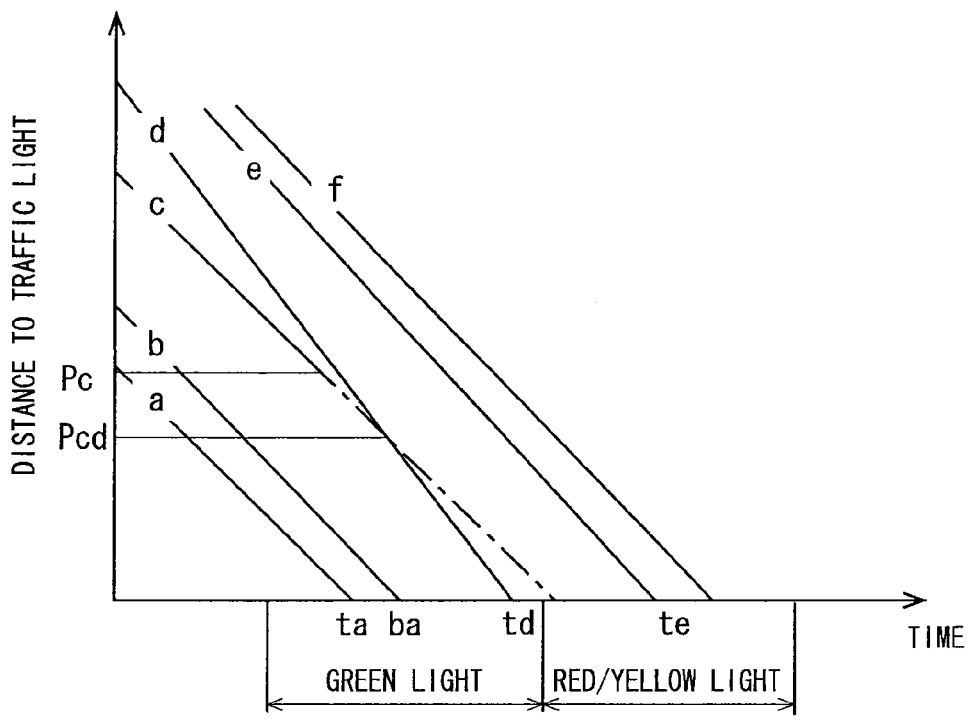
FIG. 5 is a diagram illustrating an example of the estimation of the number of stopping vehicles by the stopping vehicle estimating unit of the drive assistance device according to the embodiment of the present invention using the information of driving positions and driving speeds of different vehicles as the traffic information.
Figure 6:
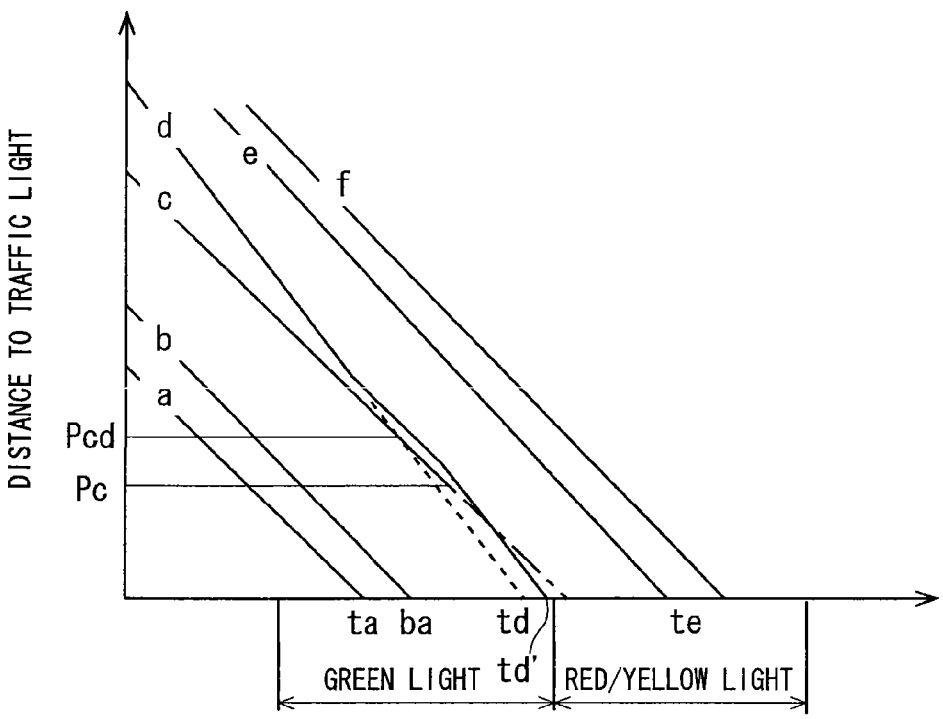
FIG. 6 is a diagram illustrating an example of the estimation of the number of stopping vehicles by the stopping vehicle estimating unit of the drive assistance device according to the embodiment of the present invention using the information of driving positions and driving speeds of different vehicles as the traffic information.

In this case, the stopping vehicle estimating unit 2 does not calculate the signal arrival time tc of the different vehicle c. Further, as described above, the signal arrival time of each of the different vehicles a, b, d, and e is calculated, and determination whether or not each of the different vehicles a, b, d, and e passes by the traffic light is executed. It should be noted that it is not necessary to consider the different vehicle c when comparing the signal arrival time of each of the different vehicles with the signal arrival time of the different vehicle immediately ahead at the current time. In this case, the signal arrival time td of the different vehicle d is compared with the signal arrival time tb of the different vehicle b. In the exemplification of FIG. 5, as the signal arrival time td is later than the signal arrival time tb, the signal arrival time td is not corrected.

In the exemplification of FIG. 5, a result that the signal arrival times of the different vehicles a, b, and d are included in the green signal time zone, and that the signal arrival time of the different vehicle e is not included in the green signal time zone is obtained. Thus, the stopping vehicle estimating unit 2 estimates that there is one stopping vehicle.

As described above, as the traveling direction of each vehicle is considered, it is possible to improve estimation accuracy of the number of stopping vehicles.

Further, a site Pc at which the different vehicle c is estimated to deviate from the drive estimated route of the own vehicle f may be compared with a site Pcd at which the different vehicle d is estimated to catch up the different vehicle c. Then, if the site Pc is located on the side opposite to the traffic light with respect to the site Pcd, the number of stopping vehicles is estimated as described above. On the other hand, if the site Pc is located closer to the traffic light than the site Pcd, as exemplified in FIG. 6, the signal arrival time td may be corrected to be time delayed by predetermined time. With this, it is possible to further improve estimation accuracy of the number of stopping vehicles. Moreover, such predetermined time may be set to be longer as the different vehicle speed of the different vehicle c is lower, and to be longer as the distance between the sites Pc and Pcd is longer, for example. This is because, the lower the different vehicle speed of the different vehicle c is, the later the signal arrival time of the different vehicle d becomes, and the longer the distance that the different vehicle d follows the different vehicle c, the later the signal arrival time of the different vehicle d becomes. With this, it is possible to further improve estimation accuracy.

Furthermore, it is possible to determine whether the different vehicles are to pass by or stop at the traffic light according to the traveling direction (straight ahead, turn right, or turn left) considering the estimated driving routes of the different vehicles, right and left-turn signals, and such. For example, a case in which the own vehicle drives along the road with a single lane on each side, but there is a right-turn lane for the next traffic light, and a right-turn signal allowing only pass through of right turn is outputted after outputting the green light at this traffic light is considered with reference to FIG. 7. Such information on the number of traffic lanes is included in the estimated driving route information of the own vehicle, and information regarding the output of the traffic light is included in the aspect indication schedule information.

Figure 7:
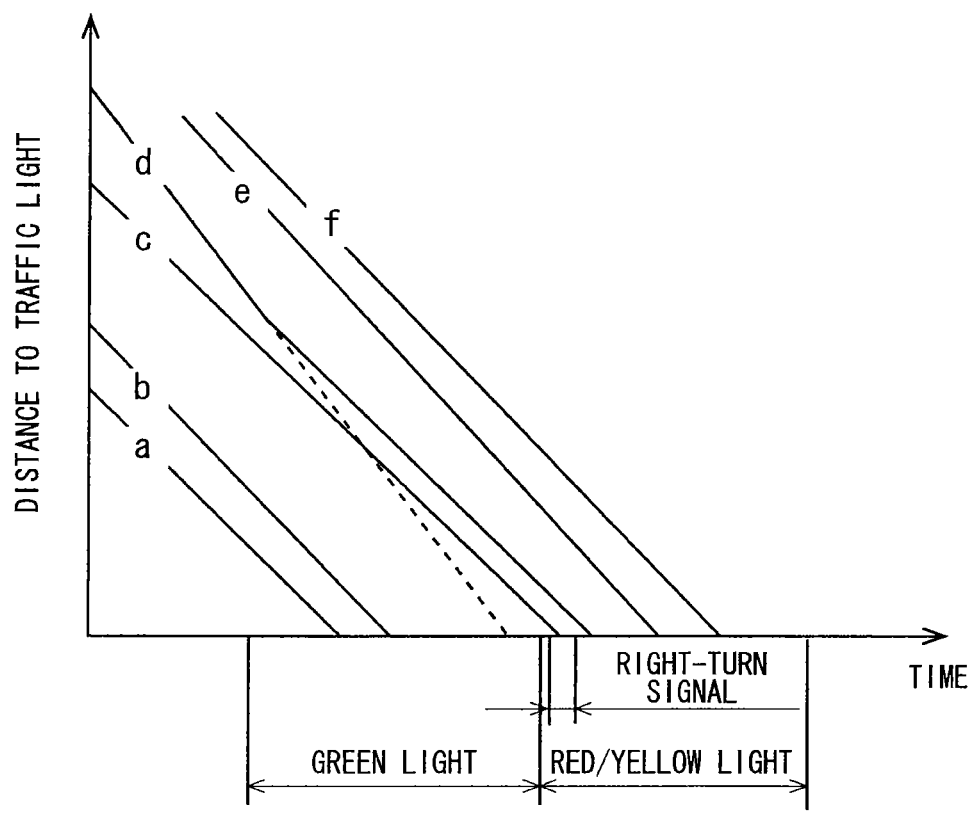
FIG. 7 is a diagram illustrating an example of the estimation of the number of stopping vehicles by the stopping vehicle estimating unit of the drive assistance device according to the embodiment of the present invention using the information of driving positions and driving speeds of different vehicles as the traffic information.

The stopping vehicle estimating unit 2 obtains a traveling direction of each of the different vehicles at the next traffic light based on the estimated driving route of each of the different vehicles inputted from the traffic information obtaining unit 5. Here, it is assumed that the different vehicle c turns right at the next traffic light, and that the different vehicles a, b, d, and e travel straight ahead. Then, the stopping vehicle estimating unit 2 calculates the signal arrival time of each of the different vehicles a to e as described above. In exemplification of FIG. 7, the signal arrival time of the different vehicle c is not included in the green light time zone, but included in a right-turn time zone during which the right-turn signal is indicated. Thus, in this case, it is determined that the different vehicle c is able to turn right at the next traffic light, and that the different vehicle c does not stop at the traffic light. In other words, if the signal arrival time of a right running different vehicle is included in one of the green signal time zone and the right-turn time zone, the stopping vehicle estimating unit 2 determines that this different vehicle pass by the traffic light. In the exemplification of FIG. 7, it is determined that the different vehicles d and e stop, and the number of vehicles is estimated to be two.

Further, in a case in which the traffic lanes are divided for each traveling direction such as the right and the left-turn lane, it is possible to estimate the number of stopping vehicles for each traffic lane or only for the traffic lane that the own vehicle is to pass through from the estimated driving routes of the own vehicle and the different vehicles. Here, one example of the estimation of the number of stopping vehicles will be described with reference to FIG. 7, taking the following case as an example. Specifically, a case in which the own vehicle drives along the road with two lanes on each side, in which there are a first traffic lane exclusive for turning left and traveling straight ahead, a second traffic lane exclusive for traveling straight ahead, and a third traffic lane exclusive for turning right at the next traffic light, and in which the traffic light outputs the right-turn signal will be described.

First, the stopping vehicle estimating unit 2 determines that the own vehicle drives along the road with two lanes on each side to the next signal based on the estimated driving route of the own vehicle. Next, as described above, the traveling direction of each vehicle at the next traffic light is obtained based on the estimated driving route of each of the different vehicles a to e. It should be noted that as the driving route includes a plurality of traffic lanes, a different vehicle that is located behind at the current time may overtake the own vehicle. Therefore, the traveling directions at the next traffic light may be obtained including the different vehicle that is located behind at the current time. Here, it is assumed that the different vehicles a, b, and d travel straight ahead, that the different vehicle c turns right, and that the different vehicle e turns left. Next, the signal arrival time of each vehicle is calculated as described above. As being able to overtake other vehicles, each of the different vehicles a to e is estimated to arrive at the next traffic light exactly at the calculated signal arrival time of the each of the different vehicles a to e, for example.

Then, if the signal arrival time is included in the green light time zone, this vehicle is determined to pass by the traffic light, and if the signal arrival time of the vehicle to turn right is included in the right-turn signal time zone, this vehicle is also determined to pass by the traffic light. In the exemplification of FIG. 7, the stopping vehicle estimating unit 2 determines that the different vehicle e stops between the own vehicle f and the next traffic light, and estimates the number of vehicles to be one. Next, a traffic lane of the different vehicle e that is estimated to stop is estimated. Here, as the different vehicle e is estimated to turn left at the next traffic light, the traffic lane on which the different vehicle e stops is estimated to be the first traffic lane. Thus, in the exemplification of FIG. 7, it is estimated that the number of stopping vehicles on the first traffic lane is one, that the number of stopping vehicles on the second traffic lane is zero, and that the number of stopping vehicles on the third traffic lane is zero. It should be noted that the traffic lane on which the different vehicle e stops is estimated to be the third traffic lane if the different vehicle e is estimated to turn right at the next traffic light, and the traffic lane on which the different vehicle e stops is estimated to be the traffic lane on which the different vehicle e drives at the current time if the different vehicle e is estimated to travel straight ahead at the next traffic light.

It should be noted that as described above, it is possible to estimate the number of stopping vehicles of the different vehicles stopping on the traffic lane on which the own vehicle drives when passing by the next traffic light, without estimating the number of stopping vehicles on other traffic lanes. For example, if the own vehicle is to turn left at the next traffic light, it is possible to calculate the signal arrival time of the vehicle driving on the first traffic lane at the current time and of the vehicle estimated to turn left at the next traffic light, and to estimate the number of stopping vehicles only on the first traffic lane.

As described above, by estimating the number of stopping vehicles using the traveling directions of the different vehicles, it is possible to improve estimation accuracy of the number of stopping vehicles.

It should be noted that while the stopping vehicle estimating unit 2 estimates the number of stopping vehicles at the next traffic light in the example described above, it is possible to calculate the number of stopping vehicles at a plurality of traffic lights by which the own vehicle is to pass along its estimated driving route, in addition to the next traffic light.

Further, when the numbers of stopping vehicles at the plurality of traffic lights are estimated, the following influence may be considered. Specifically, this is an influence in which as the number of stopping vehicles stopping at one traffic light is large, vehicles stopping at a previous traffic light increase, as may occur between traffic lights at a relatively close distance. In other words, it is possible to consider the influence of a traffic light that is located ahead given to a line of vehicles stopping at a previous traffic light.

Further, it is possible to obtain the length of the stopping vehicle line by previously setting a length of each vehicle (or a value obtained by adding an inter-vehicular distance (e.g., 1 m) to this length, the same applies to the following), and multiplying this length by the number of stopping vehicles.

Next, in Step S6, the passable time zone estimating unit 3 estimates the passable time zone at each traffic light based on the number of stopping vehicles (or the length of the stopping vehicle line) estimated in Step S5 and the aspect indication schedule information obtained in Step S3.

FIG. 8 shows relation between the aspect indication schedule of the traffic light and the passable time zone of the own vehicle. The passable time zone is from time t1, at which the vehicle line waiting time period T passes after the traffic light starts the green light indication, to time t2, at which the traffic light starts the yellow light indication. Therefore, a method of estimating the passable time starts first from calculating the vehicle line waiting time period T.

For example, where the number of stopping vehicles of the different vehicles stopping between the own vehicle and the traffic light is n, the vehicle line waiting time period T is expressed by the following expression in a simplified manner.

$$T = C \cdot n + \alpha \quad (1)$$

Here, C is waiting time that increases as a single vehicle is added, and representing time after one vehicle passes by the traffic light till a following vehicle passes by the traffic light. Further, a represents time after all of the vehicles between the own vehicle and the traffic light pass by the traffic light till the own vehicle is able to pass. It should be noted that when the length of the stopping vehicle line is inputted from the stopping vehicle estimating unit 2, a quotient obtained by dividing the length of the stopping vehicle line taking the length per vehicle as a divisor may be calculated as the number of stopping vehicles n. It should be noted that if the calculated value is not an integer, a value obtained by rounding the value to an integer may be determined as the number of stopping vehicles n, or the calculated value may be determined as the number of stopping vehicles as it is.

α and C may be may be fixed values by the system, or may change depending on the class of the road along which the traffic light is present (for example, making C smaller for a main road), or on the driving route of each vehicle (for example, making C for a vehicle turning left larger). Further, the values of C and a may be adjusted to be larger than usual in a situation, for example, in which the own vehicle is estimated to turn right at the traffic light based on the estimated driving route of the own vehicle, in which there is the right-turn lane at the road intersection by this traffic light, and in which the number of stopping vehicles of the right-turn lane is obtained from the stopping vehicle estimating unit 2. With this, the situation in which a line of vehicles turning right is not easily reduced may be considered. Further, in a case in which there is no exclusive lane for turning right or left at the road intersection by the traffic light, but in which the information of the traveling direction of the different vehicles at the traffic light (such as turning right or left) is obtained, a and C may be adjusted according to its proportion (for example, making C larger as the proportion of the number of vehicles turning left or turning right to the number of stopping vehicles is larger).

Then, the passable time zone estimating unit 3 calculates a time zone excluding the vehicle line waiting time period T from beginning of the green light time zone as a passable time zone Tt. As described above, as the time zone after the different vehicles stopping between the own vehicle and the traffic light pass by the traffic light is estimated as the passable time zone, it is possible to estimate a suitable passable time zone better accommodating the actual traffic situation.

Next, in Step S7, the recommended speed calculating unit 4 calculates a recommended speed pattern suppressing energy consumption using the own vehicle current position and the own vehicle speed obtained in Step S1, the estimated driving route of the own vehicle from the own vehicle current position obtained in Step S2, and the passable time zone for each traffic light estimated in Step S6. While a specific example of the calculation of the recommended speed pattern suppressing energy consumption will be later described, the calculated recommended speed pattern is a speed pattern such that stopping and starting again at the traffic light is not performed as much as possible considering the vehicle line waiting time period T, for example, to suppress energy consumption due to acceleration. Further, in a case in which it is not possible to calculate a speed pattern enabling to pass through without stopping at the traffic light, a speed pattern utilizing an engine brake or a regenerative brake may be calculated.

Figure 9:
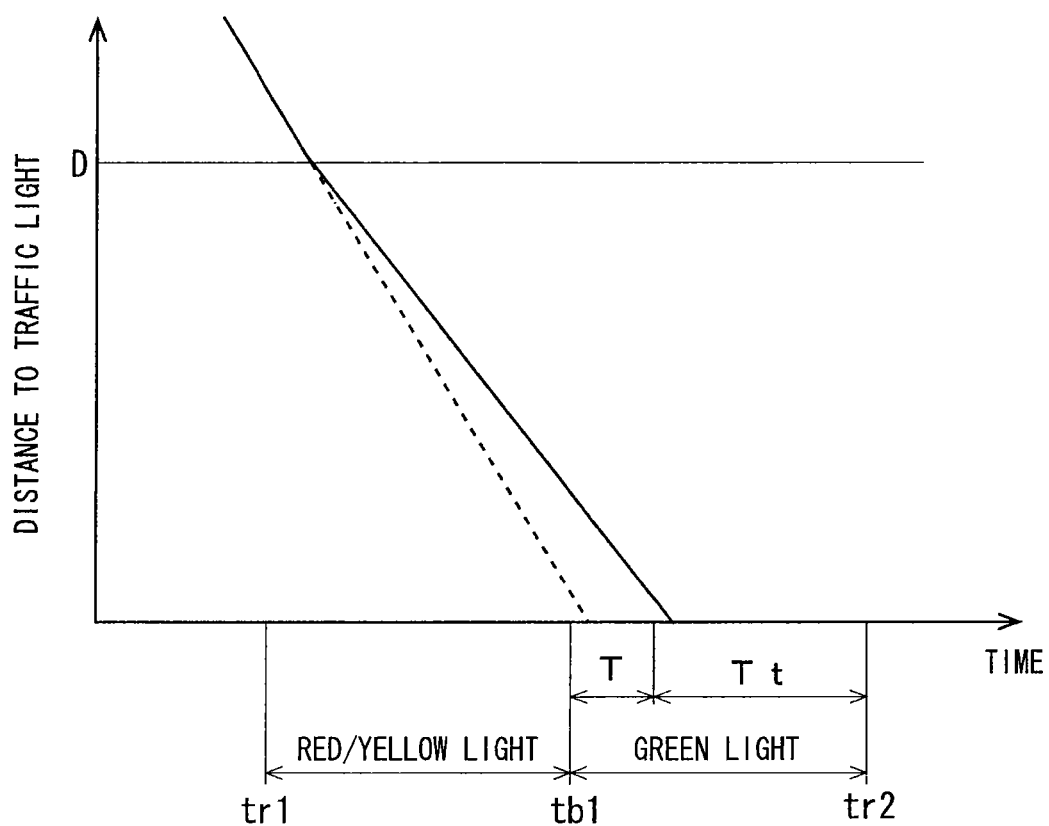
FIG. 9 is a diagram illustrating an example of calculation of a recommended speed pattern to an ensuing traffic signal by a recommended speed calculating unit of the drive assistance device according to the embodiment of the present invention.

FIG. 9 shows an example of the calculation of the recommended speed pattern at a site whose distance to an ensuing traffic light is D considering the passable time zone of this traffic light. It is assumed that time at which the indication that the traffic light is impassable (red/yellow light) starts is tr1 and tr2, time at which indication that it is passable starts (green light) is tb1, and the vehicle line waiting time period estimated at the time point at which the distance from the own vehicle to the traffic light is D (current time) is T. For example, a case in which a speed pattern enabling to pass by the traffic light without stopping is calculated in order to reduce consumption energy due to deceleration/re-acceleration at the traffic light will be described. Specifically, the speed pattern is calculated such that the own vehicle passes by the traffic light during a period from time at which a line of stopping vehicles is estimated to be resolved (time tb1+time period T) to time tr2 (passable time zone). In FIG. 9, a distance in a case in which the own vehicle drives according to the estimated speed pattern is represented by a solid line within a range equal to or shorter than the distance D, and a distance in a case in which the own vehicle maintains the original speed is represented by a broken line. On the one side, if the speed pattern is calculated so as to pass through near the time tb1 in the green light time zone as in the conventional technique, it is actually necessary to stop or decelerate due to the line of vehicles waiting at the signal. However, according to this speed pattern, by using the passable time zone from the passable time zone estimating unit 3 as the passable time zone for the traffic light, instead of the green light time zone itself, and by adjusting the speed pattern so as to pass by the traffic light during the time zone during which the line of vehicles is estimated to be resolved, it is possible to pass by the signal without stopping more surely. Further, in a case in which it is necessary to stop even if the speed of the own vehicle is adjusted, a speed pattern to stop while reducing the consumption energy considering an engine brake or regeneration may be generated.

Upon completion of the process in Step S7, the process in FIG. 2 ends.

Figure 10:
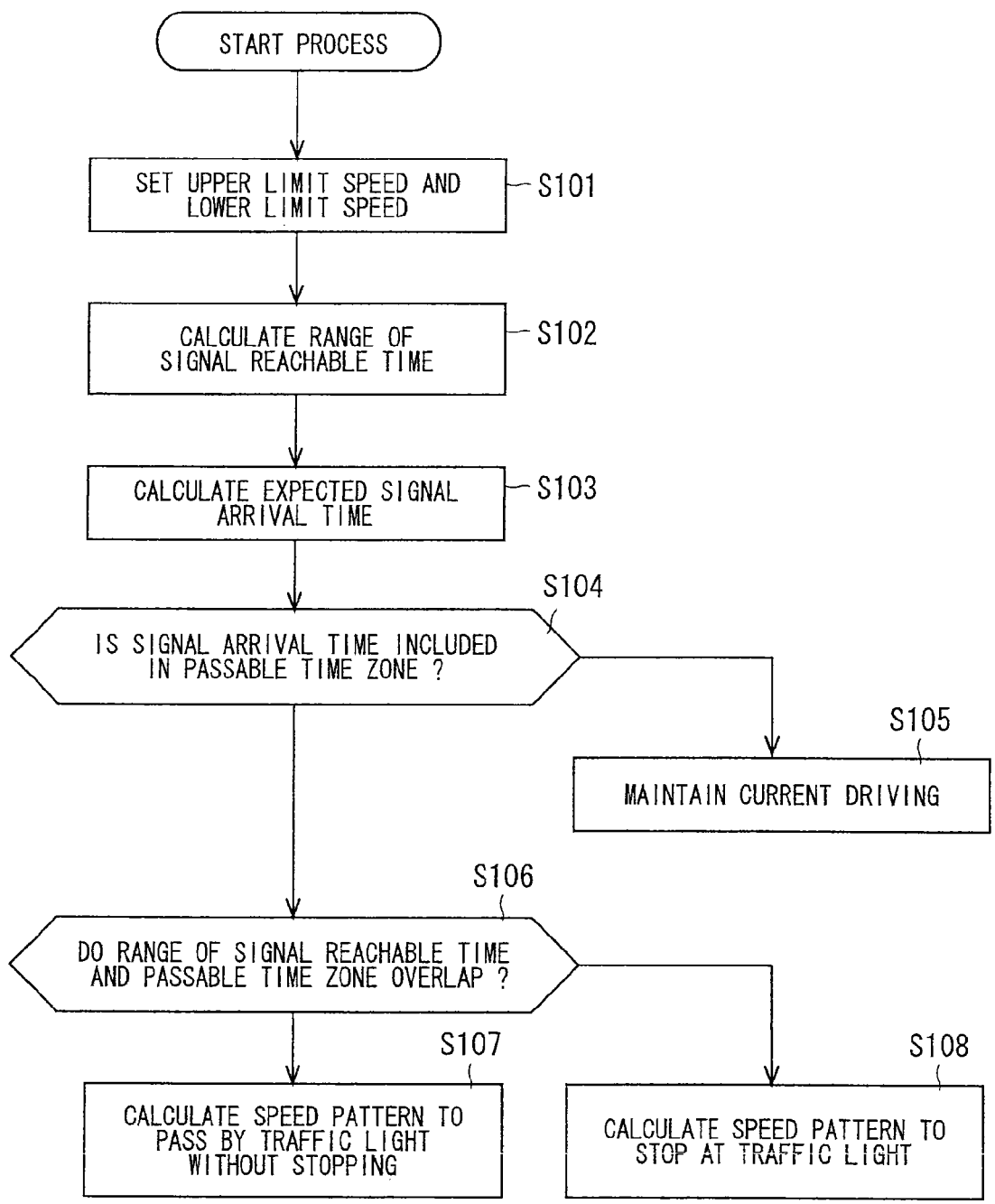
FIG. 10 is a flowchart showing one example of an operation of the recommended speed calculating unit of the drive assistance device according to the embodiment of the present invention.

FIG. 10 is a flowchart showing the operation of the recommended speed calculating unit 4 of the drive assistance device 1 according to the embodiment 1 of the present invention when calculating the recommended speed pattern for the own vehicle to one ensuing signal. Hereinafter, each process in FIG. 10 will be described.

First, in Step S101, the recommended speed calculating unit 4 sets a maximum value and a minimum value of a cruising speed to a target traffic light ahead and closest to the own vehicle along the estimated driving route. The cruising speed is a speed to be maintained by the own vehicle while driving, and its maximum value and its minimum value are determined in the following manner, for example. The maximum value is set to be a speed limit of the estimated driving route to the traffic light, for example. Such a speed limit is included in the estimated driving route information. Alternatively, it is possible to set to the different vehicle speed, if the different vehicle speed of the different vehicle that is driving around the own vehicle may be obtained. The minimum value is set to be at a predetermined proportion (for example, 80% or such) of the maximum value or the current own vehicle speed, for example.

Next, in Step S102, the recommended speed calculating unit 4 obtains a range of time to be able to arrive at the target traffic light (hereinafter referred to as "signal reachable time"). For example, it is assumed that time to arrive at the signal (hereinafter referred to as "signal arrival time") in a case in which the own vehicle accelerates to the maximum value of the cruising speed from the current speed and drives in the speed pattern so as to maintain the cruising speed is taken as earliest signal reachable time, and the signal arrival time in which the own vehicle decelerates to the minimum value of the cruising speed from the current speed, and drives in the speed pattern so as to maintain the cruising speed is taken as latest signal reachable time. Further, if the different vehicle positions and the different vehicle speeds of the different vehicles may be obtained from the traffic information obtaining unit 5, it is possible to adjust the signal reachable time based on the determination whether or not the own vehicle catches up the different vehicles or on information whether or not overtaking is allowed. Such adjustment is similar to the operation described according to the stopping vehicle estimating unit 2. Moreover, if information on a slope or a curve along the estimated driving route may be obtained, it is possible to calculate the signal arrival time in a case in which the speed pattern is adjusted according to regulations and shapes of the estimated driving route such as natural acceleration and deceleration at the slope or deceleration at the curve. Such a speed pattern may be provided in the following manner, for example. For example, the road from the own vehicle to the traffic light is divided into a plurality of sections (for example, 1 m section), and a speed in each section is determined. For example, in some of the sections from the current position, the speed in these sections is determined so as to reach the maximum value or the minimum value at a acceleration rate or at a deceleration rate that have been predetermined, and the speed is determined to be the maximum value or the minimum value if the subsequent section is linear, and determined to be a speed according to curvature of the curve if the section is a part of the curve, the speed is reduced by a reduction amount according to a slope angle if the section is near the beginning of an uphill, and the speed is increased by an increased amount according to a slope angle if the section is near the beginning of a downhill. Then, summation of the values obtained by dividing the length of each section by the speed of the corresponding section is calculated based on the speed pattern. Such summation is time required to arrive at the traffic light from the current position.

Next, in Step S103, the recommended speed calculating unit 4 calculates expected signal arrival time t. The expected signal arrival time is time expected to arrive at the target traffic light while maintaining the current own vehicle speed in principle. However, if the different vehicle current positions and the different vehicle speeds of the different vehicles may be obtained from the traffic information obtaining unit 5, it is possible to adjust the expected signal arrival time t based on the determination whether or not the different vehicles are caught up or on the information whether or not overtaking is allowed. Further, if information on a slope or a curve along the estimated driving route may be obtained, it is possible to calculate the expected signal arrival time t in a case in which the speed pattern is adjusted according to regulations and shapes of the driving route such as natural acceleration and deceleration at the slope or deceleration at the curve. It should be noted that an order to execute Steps S102 and S103 may be reverse.

Next, in Step S104, the recommended speed calculating unit 4 determines whether or not the expected signal arrival time t calculated in Step S103 is within a range of the passable time zone Tt obtained from the passable time zone estimating unit 3. If the expected signal arrival time t is within the range of the passable time zone Tt, a process in Step S105 is executed. Further, if the expected signal arrival time t is outside the range of the passable time zone Tt, that is, when it is determined to stop at the target traffic light in a case of maintaining the current driving, a process in Step S106 is executed.

In Step S105, the recommended speed calculating unit 4 calculates a speed pattern so as to maintain the current speed as much as possible as the recommended speed pattern. For example, the recommended speed calculating unit 4 uses the speed pattern generated to calculate the expected signal arrival time t in Step S103 as the recommended speed pattern. Upon completion of the process in Step S105, the process in FIG. 7 ends.

In Step S106, the recommended speed calculating unit 4 determines whether or not it is possible to arrive at the signal within the range of the passable time zone Tt obtained from the passable time zone estimating unit 3. This determination is executed by determining whether the range of the signal reachable time calculated in Step S102 and the range of the passable time zone Tt are overlapping. If it is determined that the own vehicle is able to arrive at the target traffic light during the passable time zone Tt, a process in Step S107 is executed, and if it is determined that the own vehicle is not able to arrive at the target traffic light during the passable time zone Tt, a process in Step S108 is executed.

In Step S107, a recommended speed pattern so as to pass by the target traffic light without stopping is calculated. As the recommended speed pattern, it is possible to select one whose cruising speed is closest to the current own vehicle speed out of speed patterns enabling to pass by the signal, for example. In other words, it is possible to select one with lowest consumption energy out of the speed patterns enabling to pass by the signal. Further, at this time, in a case in which deceleration from the current own vehicle speed is necessary, it is possible to calculate a speed pattern in which an engine brake or a regenerative brake is positively utilized. Moreover, if the different vehicle current positions and the different vehicle speed of the different vehicles may be obtained from the traffic information obtaining unit 5, it may be determined whether or not the own vehicles would catch up to the different vehicles and a speed pattern to follow may be calculated if overtaking is not possible; if the information on the slope and the curve along the estimated driving route may be obtained, it is possible to generate a speed pattern according to regulations and shapes of the driving route such as natural acceleration and deceleration at the slope or deceleration at the curve. Upon completion of the process in Step S107, the process in FIG. 7 ends.

In Step S108, the recommended speed calculating unit 4 calculates a recommended speed pattern so as to reduce consumption energy due to stopping at the signal as much as possible, as the own vehicle is required to stop at the traffic light. The recommended speed pattern calculated in Step S108 is calculated such that a speed pattern to enable stopping by positively utilizing an engine brake or a regenerative brake such as not accelerating beyond the current own vehicle speed, and starting deceleration as moderately and early as possible, for example. Specifically, a speed pattern to reduce the own vehicle speed based on a deceleration rate of the own vehicle speed employing an engine brake or a regenerative brake is calculated. Such a deceleration rate is previously set, for example. More specifically, for example, a speed pattern to reduce the own vehicle speed according to the deceleration rate is calculated when a distance to the traffic light becomes equal to or smaller than a predetermined value. It should be noted that, similarly, if the different vehicle current positions and the different vehicle speeds of the different vehicles may be obtained from the traffic information obtaining unit 5, whether or not the own vehicle catches up the different vehicles may be determined, and a speed pattern such that the own vehicle follows the different vehicles may be calculated if overtaking is not allowed. Alternatively, if the information on the slope and the curve along the estimated driving route may be obtained, it is possible to generate a speed pattern according to regulations and shapes of the driving route such as natural acceleration and deceleration at the slope or deceleration at the curve. Upon completion of the process in Step S108, the process in FIG. 7 ends.

The drive assistance device 1 notifies a driver of a recommended speed based on the calculated recommended speed pattern, for example. With this, the driver is able to drive the own vehicle so as to reduce consumption energy.

As described above, according to the drive assistance device 1 of the embodiment 1 of the present invention, it is possible to estimate the number of vehicles stopping at the traffic light ahead of the own vehicle, and to predict the time zone during which the own vehicle is able to pass by the traffic light. In addition, by calculating the recommended speed pattern utilizing the predicted passable time zone, it is possible to provide the user with driving with reduced consumption energy and enabling actual driving.

Further, if the stopping vehicle estimating unit 2 outputs the information on the change in the number of stopping vehicles over time (for example, the function or the correspondence table), the recommended speed calculating unit 4 calculates the recommended speed based on such information utilizing not only the signal passable time zone but also the vehicle line end information based on the arrival time (specifically, the number of stopping vehicles). With this, it is possible to consider the change in the number of the vehicles ahead of the own vehicle by the own vehicle accelerating or decelerating.

Hereinafter, another example of the method of estimating the number of stopping vehicles will be described.

<Another Example Of Method Of Estimating Number Of Stopping Vehicles>

The traffic information obtaining unit 5 obtains information of a position of an end of the line of different vehicles stopping at the traffic light (hereinafter referred to as vehicle line end position information) as the traffic information. Such vehicle line end position information is obtained in the following manner, for example. A predetermined center monitors the traffic situation, and stores the length of the line of stopping vehicles at each traffic light or the position of its end as the information. The traffic information obtaining unit 5 obtains the vehicle line end position information from such a center directly or via roadside wireless equipment. Alternatively, the different vehicle current positions and the different vehicle speeds may be obtained by the vehicle-to-vehicle communication, and vehicle line end information may be obtained using these. For example, if the different vehicle current positions of the respective vehicles are located in order from the traffic light to the own vehicle, and if the different vehicle speeds of all of these are zero, it is possible to determine that these different vehicles stop at the traffic light. Thus, the different vehicle current position of the different vehicle positioned at the end may be considered to be the vehicle line end position information.

The stopping vehicle estimating unit 2 obtains the vehicle line end position information of the vehicles stopping at the traffic light along the estimated driving route at the current time as the traffic information, and calculates the number of stopping vehicles stopping at this traffic light based on this. For example, based on the vehicle line end position information at the current time, a distance between the different vehicle at the end and the traffic light is calculated, and a quotient when dividing the distance taking a value previously set as a length of a single vehicle as a denominator is estimated to be the number of stopping vehicles. Alternatively, this distance may be calculated as the length of the stopping vehicle line.

According to this method of estimating the number of stopping vehicles, it is not necessary to perform complicated calculation, and the process is facilitated.

Further, the number of stopping vehicles may be estimated using the vehicle information of the different vehicles around the own vehicle (the different vehicle current positions and the different vehicle speeds) obtained by at least one of the vehicle-to-vehicle communication and a sensor of various types, in addition to the vehicle line end position information.

<Another Example Of Method Of Estimating Number Of Stopping Vehicles>

In general, as an average number of stopping vehicles per indication of through traffic prohibited at the traffic light monotonically increase with respect to the traffic volume, it is possible to estimate the number of stopping vehicles based on the traffic volume to some extent.

Thus, the traffic information obtaining unit 5 obtains the traffic volume along the estimated driving route as the traffic information. Here, travel time information (traffic jam information) is obtained as one example. The travel time information includes a predetermined section and travel time indicating how long it takes to pass through this predetermined section. In other words, the traffic information obtaining unit 5 obtains the travel time and a target section for this travel time. A value obtained by dividing the travel time by a distance of this section reflects the traffic volume.

The traffic volume (for example, the travel time information) is obtained from a predetermined center (for example, VICS (registered trademark) center) by the traffic information obtaining unit 5, for example. Alternatively, it is possible to obtain from the roadside wireless equipment, or from the center via the roadside wireless equipment. Alternatively, it is possible to obtain by learning from the past drive history. More specifically, for example, the traffic information obtaining unit 5 records the traffic volume (or the travel time information) that the own vehicle has driven in the recording medium that is not depicted, and the past traffic volume in the same time zone and along the driving route may be used as the traffic volume at the current time.

The number of stopping vehicles increases in a monotonic non-decreasing manner over time during the red/yellow light time zone from a time point at which the traffic light starts the indication of red light (or yellow light) to a time point at which the green light indication is started. In other words, at the end of the red/yellow light time zone (the point output of the green light starts), the number of stopping vehicles takes a maximum value (corresponding to a first value) nmax. In general, the maximum number of stopping vehicles nmax tends to become larger as the traffic volume is large. Therefore, positive correlation is established between the traffic volume (for example, the value dividing the travel time by the section) and the maximum number of stopping vehicles nmax. Such positive correlation is previously set, for example, and recorded in the recording medium.

Here, the number of stopping vehicles n is assumed to increase in proportion to elapsed time t in the red/yellow light time zone. Under such an assumption, as the number of stopping vehicles n at the elapsed time t from beginning of a red/yellow light time zone T_RtoB, the following expression is employed.

$$N=(t/T\_RtoB) \cdot nmax \text{ (where } t<T\_RtoB)  \quad (2)$$

The stopping vehicle estimating unit 2 estimates the number of stopping vehicles n based on the expression (2), when the signal arrival time t at which the own vehicle is predicted to arrive at the traffic light is included in the red/yellow light time zone T_RtoB. It should be noted that it is possible to round a value calculated based on the expression (2) into an integer, or to use the calculated value as it is.

On the other hand, when the signal arrival time t is not included in the time zone T_RtoB, that is, included in the green light time zone, the stopping vehicle estimating unit 2 estimates the number of stopping vehicles n to be the maximum number of stopping vehicles nmax. Specifically, the number of stopping vehicles n at the time point at which the green light indication is started is employed. This is expressed in the following expression.

$$n=nmax \text{ (where } t \geq T\_RtoB)  \quad (3)$$

Figure 11:
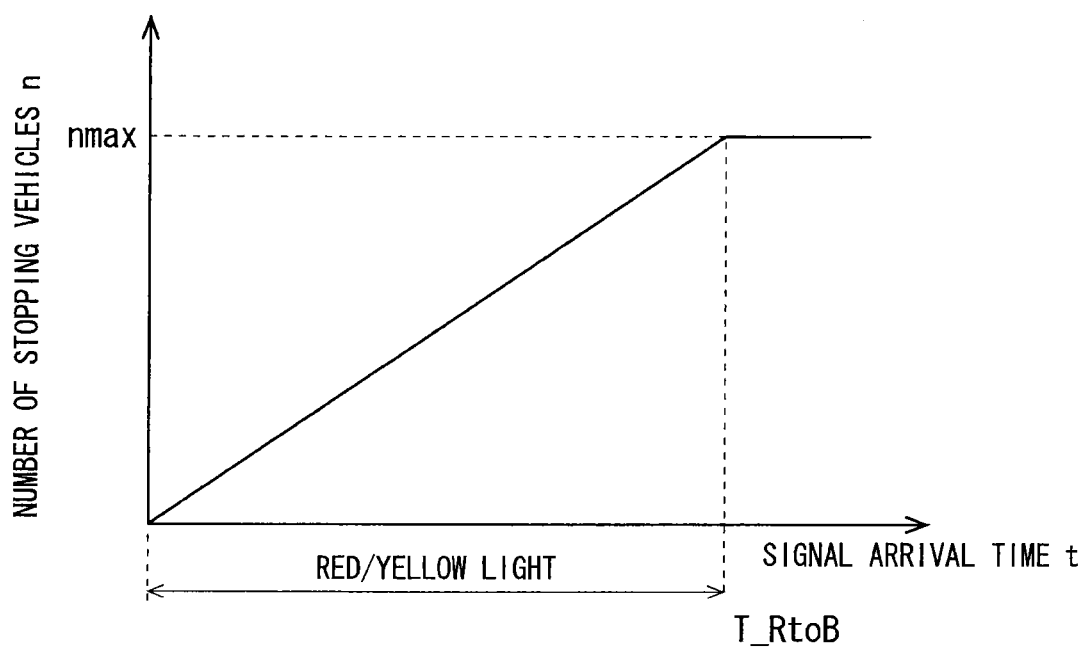
FIG. 11 is one example of a chart showing transition of the number of stopping vehicles with respect to signal arrival time in the stopping vehicle estimating unit of the drive assistance device according to the embodiment of the present invention in a case in which a traffic volume is obtained as the traffic information.

FIG. 11 shows a chart indicating a transition of the number of stopping vehicles estimated based on the expression (2) and the expression (3) when the traffic volume is obtained as the traffic information.

It should be noted that the expression (2) is described in the following manner. Specifically, the stopping vehicle estimating unit 2 estimates a multiplication value between the first value nmax and a second value having positive correlation with the elapsed time t from beginning of the red/yellow light time zone until the own vehicle arrives near the traffic light and taking a value equal to or greater than zero and equal to or smaller than 1 (for example, t/T_RtoB) as the number of stopping vehicles n.

According to this method of estimating the number of stopping vehicles, it is not necessary to perform complicated calculation, and the process is facilitated. Further, the function of obtaining the traffic volume (the travel time information) or such from the center is mounted on a common car navigation system. Thus, it is not necessary to provide a new function such as the vehicle-to-vehicle communication, for example.

It should be noted that if the vehicle end positional information is obtained, the number of stopping vehicles may be estimated combining the traffic volume (the travel time) and the vehicle end positional information. With this, it is possible to improve estimation accuracy of the number of stopping vehicles or the line of stopping vehicles.

While the invention has been shown and described in detail, the foregoing description is in all aspects illustrative and not restrictive. It is therefore understood that numerous modifications and variations can be devised without departing from the scope of the invention.

REFERENCE MARKS IN THE DRAWINGS

1: Drive Assistance Device, 2: Stopping Vehicle Estimating Unit, 3: Passable Time Zone Estimating Unit, 4: Recommended Speed Calculating Unit, 6: Signal Information Obtaining Unit

The invention claimed is:

1. A drive assistance method for use with a vehicle, comprising:
   obtaining estimated driving route information including information regarding an estimated driving route along which own vehicle as said vehicle is expected to drive and a position of a site at which a traffic light is provided along said estimated driving route;
   obtaining, from a global positioning system receiver, information regarding an own vehicle position indicating a position of said own vehicle and an own vehicle speed indicating a speed of said own vehicle;
   obtaining schedule information including information of a traffic light passable time zone during which said traffic light makes an indication that said site is passable;
   obtaining traffic information of said estimated driving route;
   estimating one of a number of stopping vehicles and a length of a stopping vehicle line of different vehicles that are stopping at said site along said estimated driving route ahead of said own vehicle closer to said site than said own vehicle, based on a position information of said site, said own vehicle position, said own vehicle speed, and said traffic information;
   estimating a passable time zone during which said own vehicle is passable through said site based on the one of said number of stopping vehicles and said length of the stopping vehicle line that have been estimated by said estimating of one of the number of stopping vehicles and the length of a stopping vehicle line, and on said schedule information;
   calculating a speed pattern to reduce consumption energy when driving, based on said passable time zone, said estimated driving route information, said own vehicle position, and said own vehicle speed; and
   notifying a driver of a recommended speed using the speed pattern which has been calculated.

2. The drive assistance method according to claim 1, wherein
   said estimating of the passable time zone estimates a time zone out of said traffic light passable time zone obtained based on said schedule information excluding a period having positive correlation with the one of said number of stopping vehicles and said length of the stopping vehicle line from its beginning to be said passable time zone.

3. The drive assistance method according to claim 2, wherein
   said obtaining of traffic information obtains a different vehicle position of different vehicles around the own vehicle and a different vehicle speed of said different vehicles as said traffic information, and
   said estimating of one of a number of stopping vehicles estimates whether or not said different vehicles are to stop at said traffic light based on said different vehicle position and said different vehicle speed, said position information of said site, and said schedule information, and estimates said number of stopping vehicles.

4. The drive assistance method according to claim 2, wherein
   said obtaining of traffic information obtains a traffic volume of said estimated driving route as said traffic information, and
   said estimating of one of a number of stopping vehicles estimates one of said number of stopping vehicles and said length of the stopping vehicle line according to said traffic volume.

5. The drive assistance method according to claim 4, wherein
   when said own vehicle is estimated to arrive during a traffic light impassable time zone during which an indication of said traffic light is impassable, said estimating of one of a number of stopping vehicles estimates, as the one of said number of stopping vehicles and said length of the stopping vehicle line, a multiplication value between a first value having positive correlation with said traffic volume with respect to a section from said own vehicle to said traffic light and a second value having positive correlation with a period from beginning of said traffic light impassable time zone to time at which said own vehicle is expected to arrive at said traffic light and taking a value equal to or greater than 0 and equal to or smaller than 1.

6. The drive assistance method according to claim 1, wherein
   said obtaining of traffic information obtains a different vehicle position of different vehicles around the own vehicle and a different vehicle speed of said different vehicles as said traffic information, and
   said estimating of the number of stopping vehicles estimates whether or not said different vehicles are to stop at said traffic light based on said different vehicle position and said different vehicle speed, said position information of said site, and said schedule information, and estimates said number of stopping vehicles.

7. The drive assistance method according to claim 1, wherein
   said obtaining of traffic information obtains a traffic volume of said estimated driving route as said traffic information, and
   said estimating of one of a number of stopping vehicles estimates one of said number of stopping vehicles and said length of the stopping vehicle line according to said traffic volume.

8. The drive assistance method according to claim 7, wherein
   when said own vehicle is estimated to arrive during a traffic light impassable time zone during which an indication of said traffic light is impassable, said estimating of one of a number of stopping vehicles estimates, as the one of said number of stopping vehicles and said length of the stopping vehicle line, a multiplication value between a first value having positive correlation with said traffic volume with respect to a section from said own vehicle to said traffic light and a second value having positive correlation with a period from beginning of said traffic light impassable time zone to time at which said own vehicle is expected to arrive at said traffic light and taking a value equal to or greater than 0 and equal to or smaller than 1.

9. The drive assistance method according to claim 1, wherein
   said obtaining of schedule information includes communicating with an external device having said schedule information of said traffic light, and obtaining said schedule information from said external device through communication.

10. The drive assistance method according to claim 1, further comprising:
    recording of said schedule information of said traffic light which said own vehicle has previously passed is recorded in a recording medium, and
    said obtaining of signal information includes estimating said schedule information of said traffic light along said estimated driving route based on said schedule information recorded in said recording medium.

11. The drive assistance method according to claim 1, wherein
said calculating of a speed pattern calculates said speed pattern such that signal passing time of said own vehicle is included within a range of said passable time zone.

12. The drive assistance method according to claim 11, wherein
said calculating of a speed pattern sets an upper limit and a lower limit of the speed of said own vehicle, and calculates, when said speed pattern such that signal passing time of said own vehicle is included within a range of said passable time zone includes either a speed over said upper limit or a speed under said lower limit, a speed pattern to reduce said speed of said own vehicle based on a deceleration rate of the speed of said own vehicle when employing one of an engine brake and a regenerative brake.

13. The drive assistance method according to claim 1, wherein
said calculating of a speed pattern sets an upper limit and a lower limit of the speed of said own vehicle, and calculates, when said speed pattern such that signal passing time of said own vehicle is included within a range of said passable time zone includes either a speed over said upper limit or a speed under said lower limit, a speed pattern to reduce said speed of said own vehicle based on a deceleration rate of the speed of said own vehicle when employing one of an engine brake and a regenerative brake.

14. A drive assistance method for use with a vehicle, comprising:
obtaining estimated driving route information including information regarding an estimated driving route along which own vehicle as said vehicle is expected to drive and a position of a site at which a traffic light is provided along said estimated driving route;
obtaining, from a global positioning system receiver, information regarding an own vehicle position indicating a position of said own vehicle and an own vehicle speed indicating a speed of said own vehicle;
obtaining schedule information including information of a traffic light passable time zone during which said traffic light makes an indication that said site is passable;
obtaining information of a position of an end of a line of different vehicles stopping at said traffic light as traffic information;
estimating one of a number of stopping vehicles and a length of the stopping vehicle line of the different vehicles that are stopping at said site along said estimated driving route ahead of said own vehicle closer to said site than said own vehicle, based on a difference between said traffic information and said position of said site;
estimating a passable time zone during which said own vehicle is passable through said site, based on the one of said number of stopping vehicles and said length of the stopping vehicle line that have been estimated by said estimating of one of a number of stopping vehicles and a length of the stopping vehicle line, and on said schedule information;
calculating a speed pattern to reduce consumption energy when driving, based on said passable time zone, said estimated driving route information, said own vehicle position, and said own vehicle speed; and
notifying a driver of a recommended speed using the speed pattern which has been calculated.

* * * * *